US012744486B2

(12) United States Patent
Joo

(10) Patent No.: US 12,744,486 B2
(45) Date of Patent: Sep. 22, 2026

(54) MOTOR CONTROL APPARATUS OF BRAKE SYSTEM AND CONTROL METHOD THEREOF

(71) Applicant: HL MANDO CORPORATION, Gyeonggi-do (KR)

(72) Inventor: Kyoungjin Joo, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 248 days.

(21) Appl. No.: 18/607,473

(22) Filed: Mar. 17, 2024

(65) Prior Publication Data

US 2024/0333194 A1 Oct. 3, 2024

(30) Foreign Application Priority Data

Mar. 27, 2023 (KR) ........................ 10-2023-0039777

(51) Int. Cl.
*H02P 29/60* (2016.01)
*H02P 29/64* (2016.01)

(52) U.S. Cl.
CPC .................................... *H02P 29/64* (2016.02)

(58) Field of Classification Search
CPC ......... H02P 29/64; H02P 29/032; H02P 29/60
USPC .......................................................... 318/473
See application file for complete search history.

(56) References Cited

U.S. PATENT DOCUMENTS

| | | | | |
|---|---|---|---|---|
| 8,573,709 B2 * | 11/2013 | Suzuki | B60L 3/108 | |
| | | | 303/151 | |
| 10,654,455 B2 * | 5/2020 | Masuda | B60T 17/18 | |
| 10,784,810 B1 * | 9/2020 | Lu | H02P 27/08 | |
| 2013/0033210 A1 * | 2/2013 | Suzuki | B62D 5/0496 | |
| | | | 318/400.22 | |
| 2017/0307448 A1 * | 10/2017 | Takashima | G01K 7/427 | |
| 2020/0204101 A1 * | 6/2020 | Tokuda | F25B 1/00 | |
| 2022/0393622 A1 * | 12/2022 | Bin | H02K 11/33 | |
| 2022/0399849 A1 * | 12/2022 | Kim | H02P 29/60 | |

FOREIGN PATENT DOCUMENTS

| | | |
|---|---|---|
| JP | 2020-69856 | 5/2020 |
| KR | 10-0179574 | 5/1999 |
| KR | 10-2020-0142205 | 12/2020 |

OTHER PUBLICATIONS

Office Action dated Dec. 16, 2025 for Korean Patent Application No. 10-2023-0039777 and its English translation provided by Applicant's foreign counsel.

* cited by examiner

*Primary Examiner* — Gabriel Agared
(74) *Attorney, Agent, or Firm* — WOMBLE BOND DICKINSON (US) LLP

(57) ABSTRACT

A motor control apparatus of a brake system and a control method are provided. The motor control apparatus of a brake system includes a motor coil unit disposed in the motor, an inverter configured to supply current to the motor coil unit, a current detector configured to detect motor current supplied to the motor coil unit, and a controller configured to adjust current supplied to the motor by estimating a temperature of the motor coil unit by receiving information detected by the current detector.

15 Claims, 11 Drawing Sheets

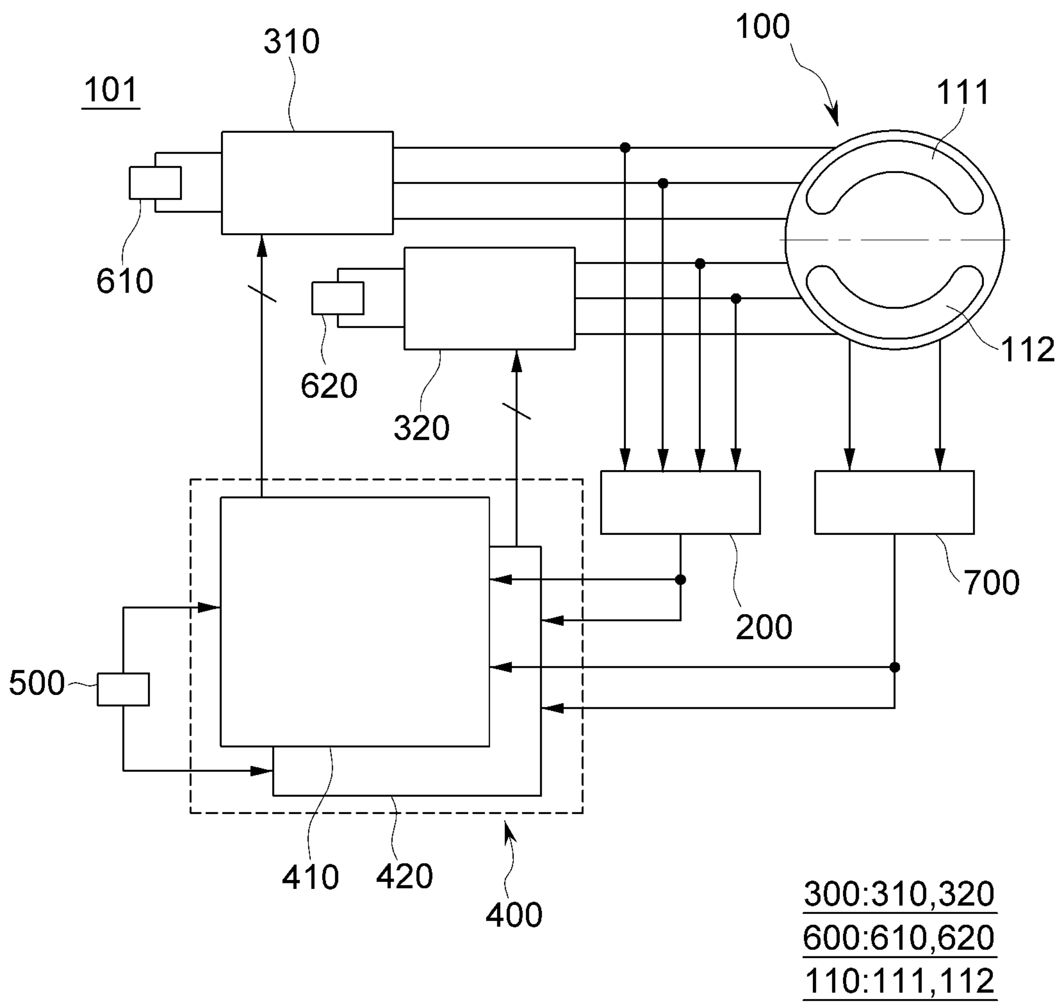
[Fig.1.]

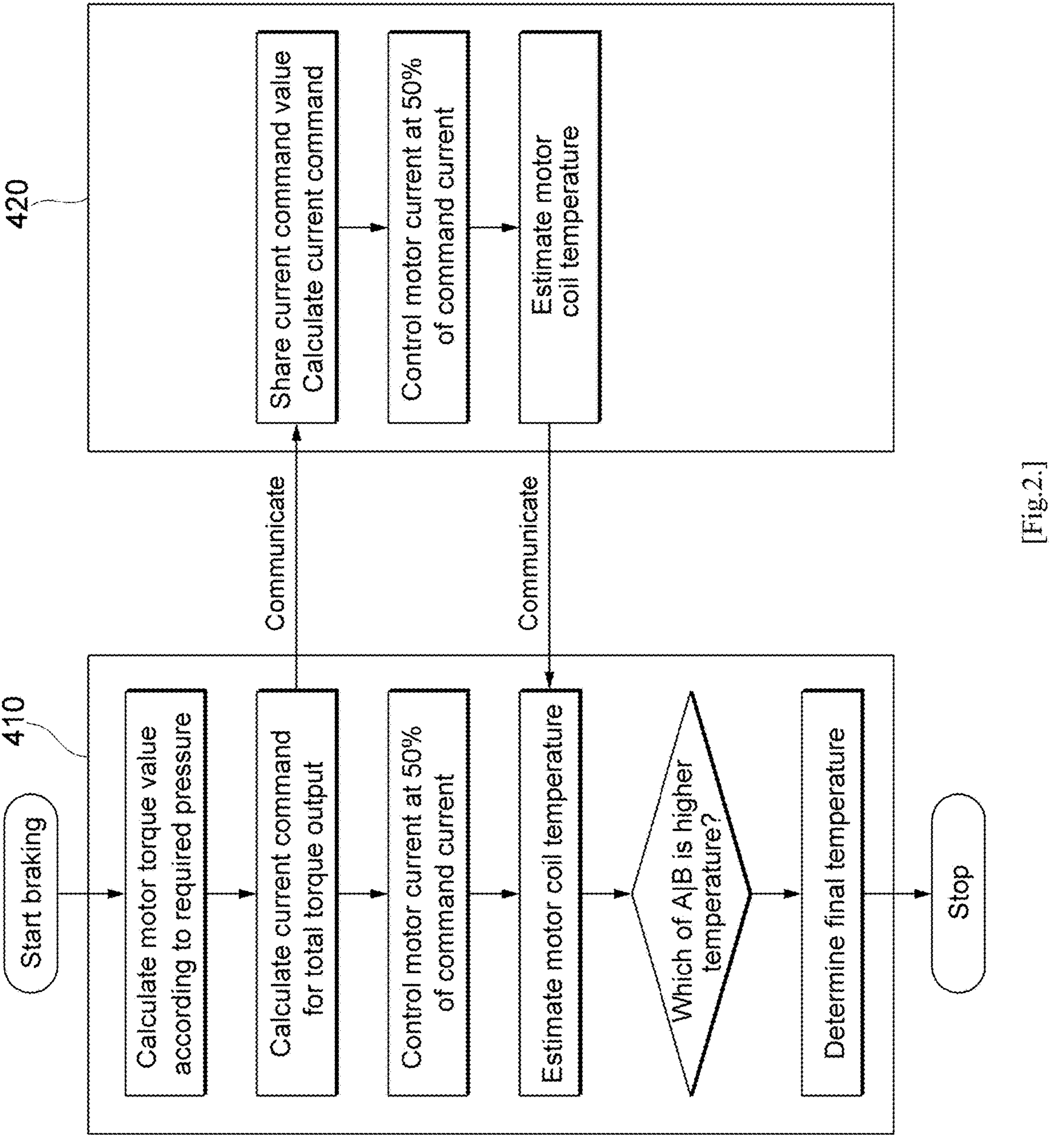
[Fig.2.]

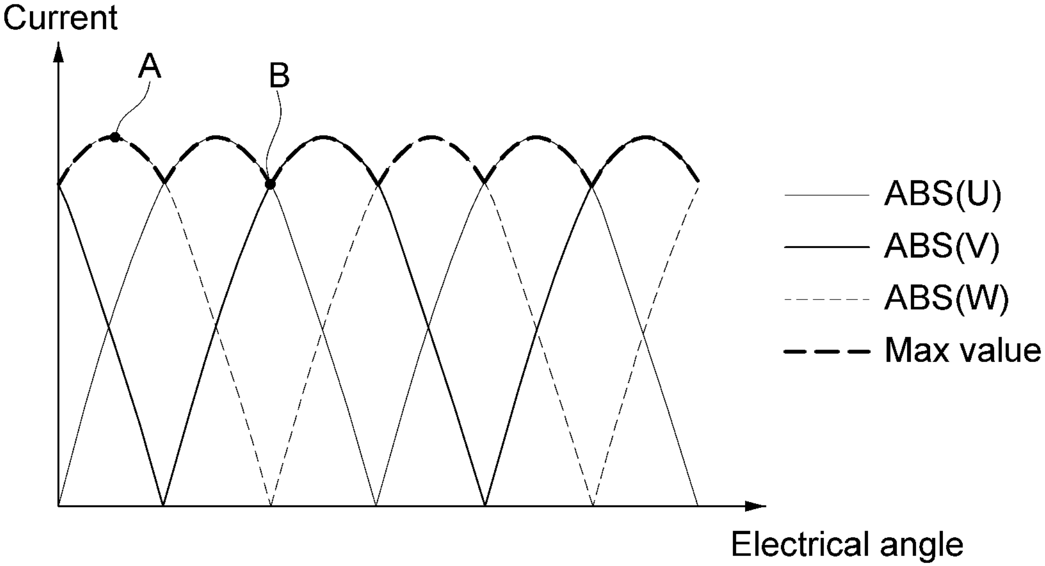
[Fig.3.]

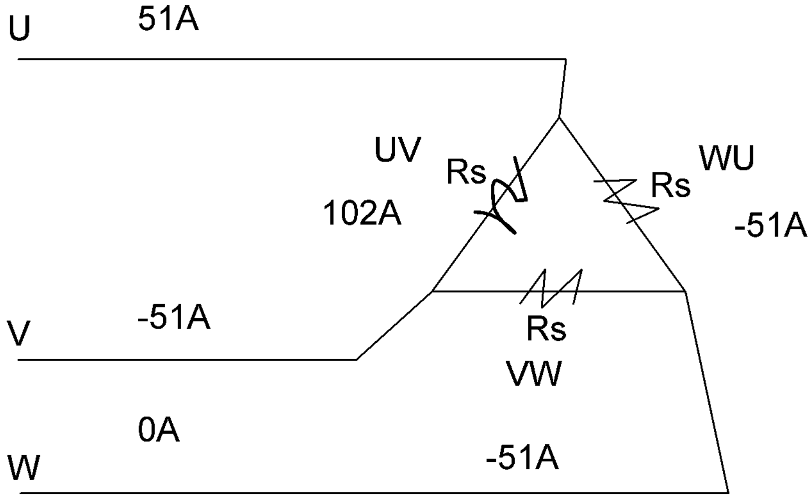
[Fig.4.]

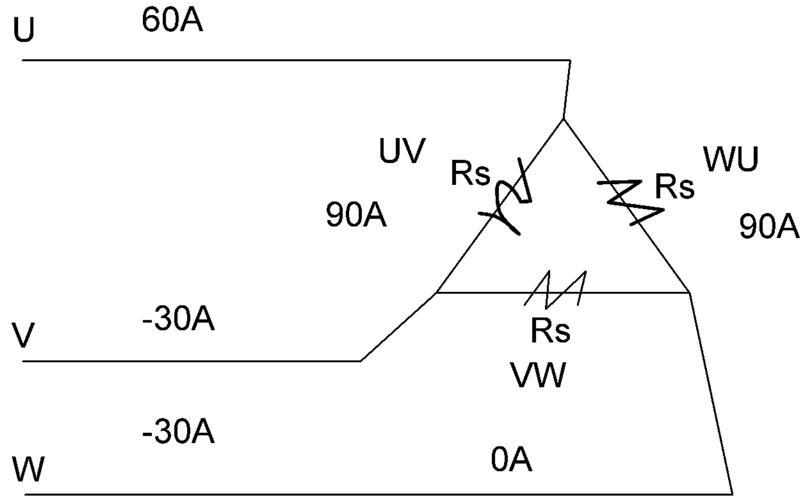
[Fig.5.]

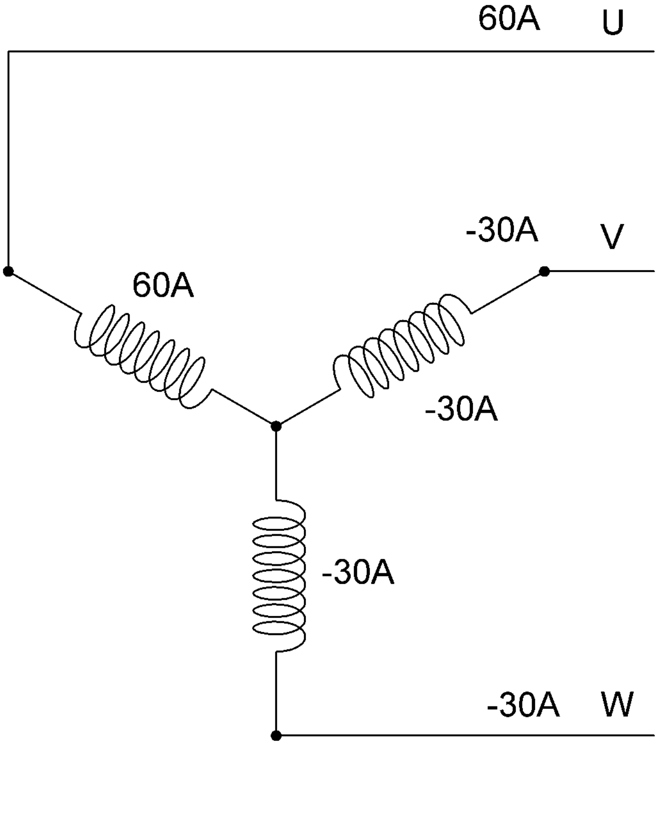
[Fig.6.]

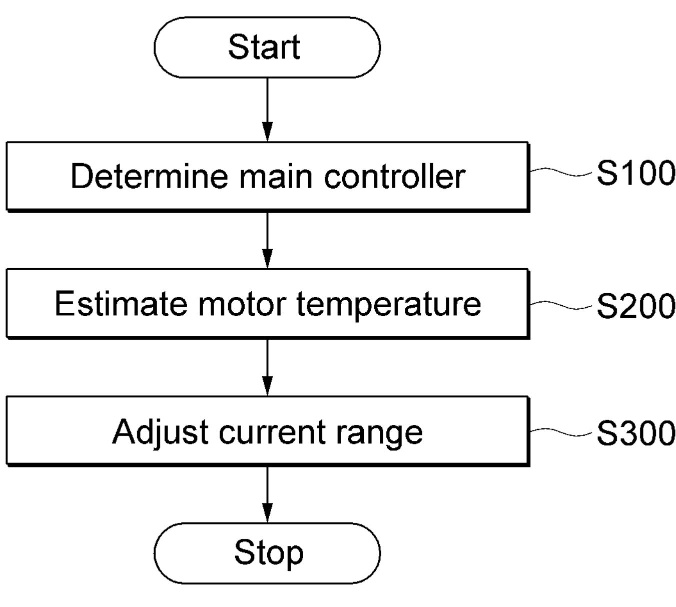
[Fig.7.]

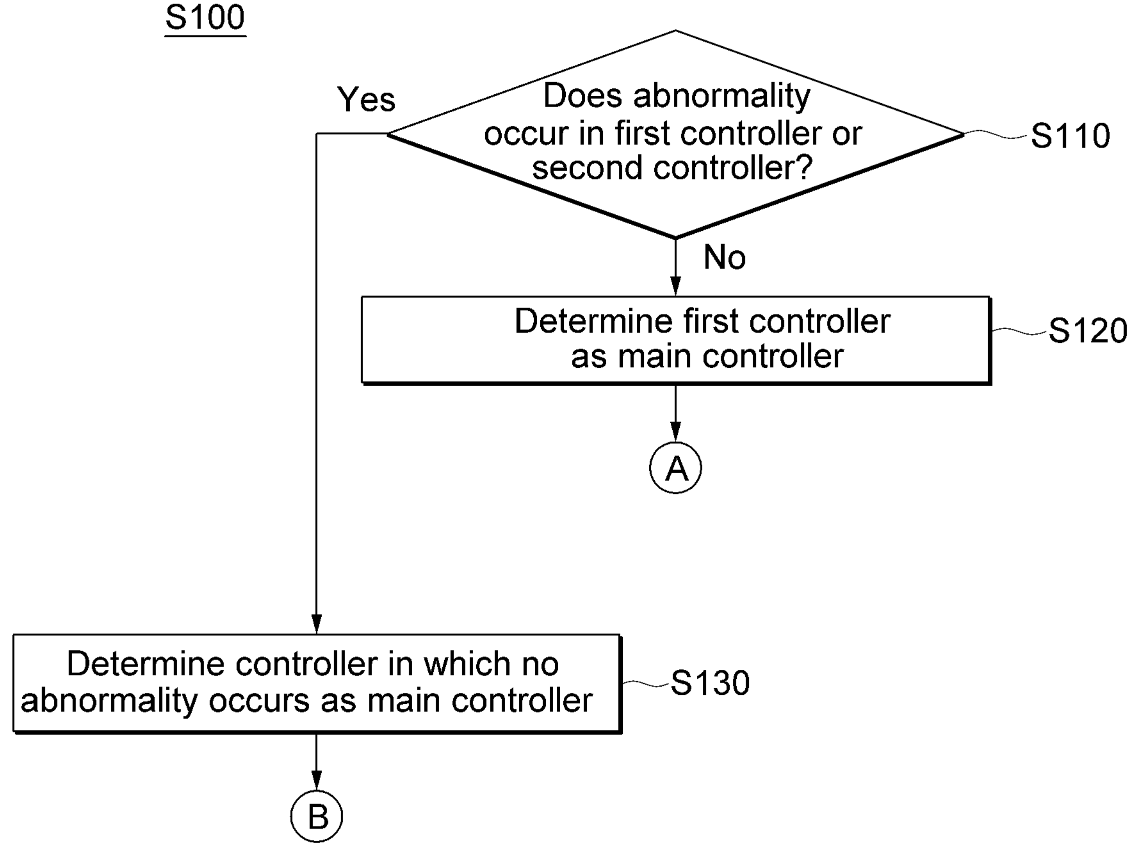
[Fig.8.]

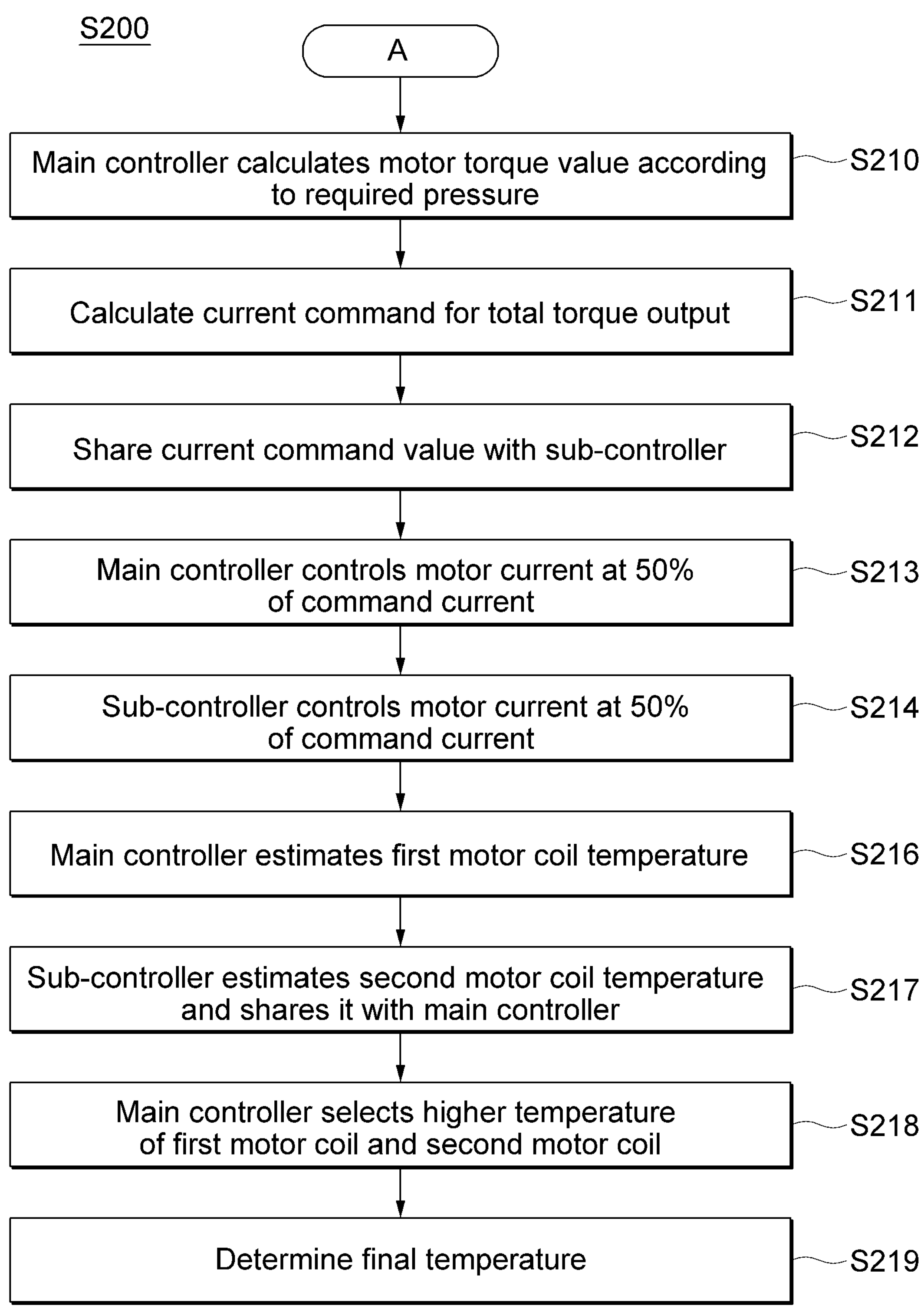
[Fig.9.]

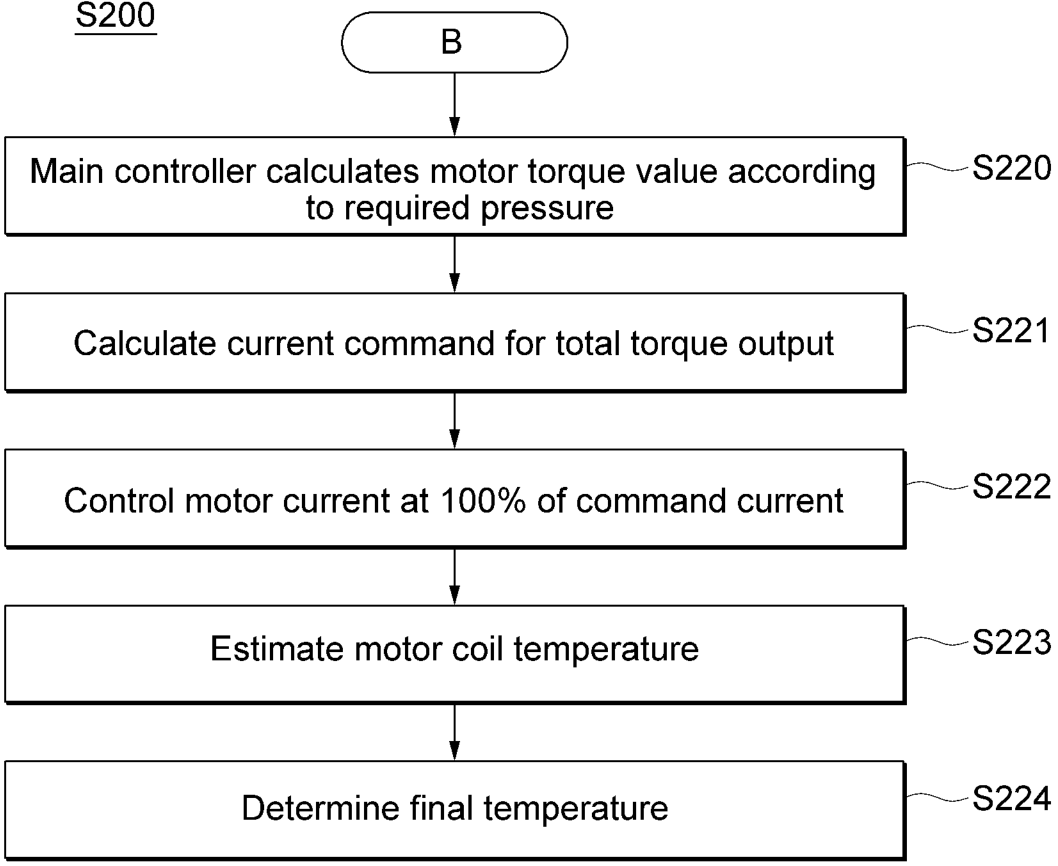
[Fig.10.]

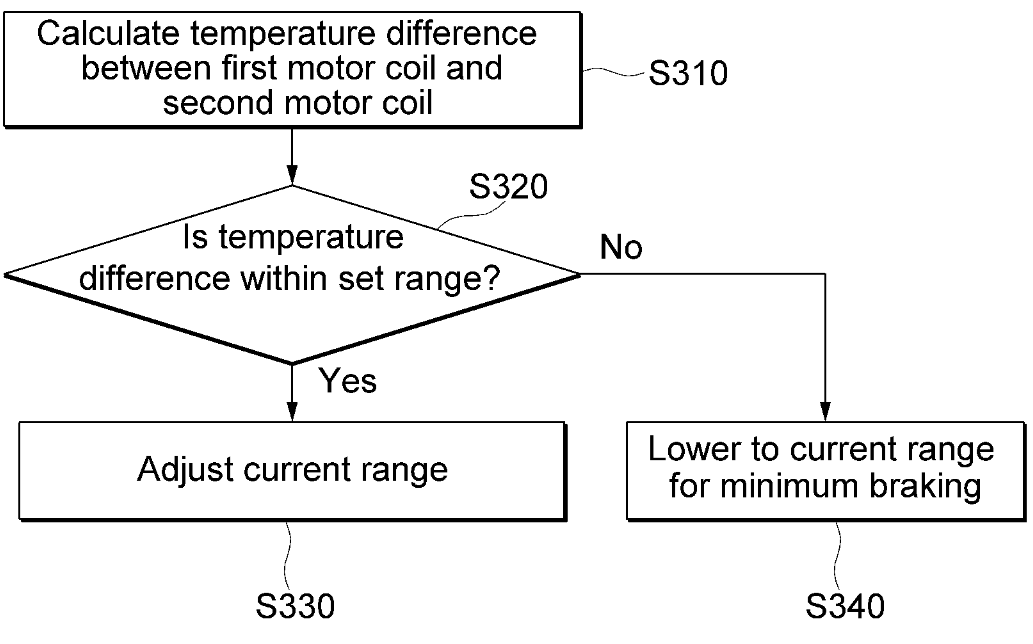
[Fig.11.]

MOTOR CONTROL APPARATUS OF BRAKE SYSTEM AND CONTROL METHOD THEREOF

CROSS-REFERENCE TO RELATED APPLICATION

This application claims the benefit of Korean Patent Application No. 10-2023-0039777 filed on Mar. 27, 2023, in the Korean Intellectual Property Office, the entire disclosure of which is incorporated herein by reference for all purposes.

BACKGROUND

1. Field of the Invention

Example embodiments of the present disclosure relate to a motor control apparatus of a brake system and a control method thereof, and more particularly, to a motor control apparatus of a brake system and a control method thereof capable of preventing a thermal load due to a high current applied to a motor that generates a braking force of the brake system.

2. Description of the Related Art

In general, a motor included in a brake system provides a braking force according to a required pressure corresponding to an operation of a brake pedal. Specifically, when a driver's will to brake is sensed, an electric brake system generates a required braking pressure through motor driving.

A three-phase permanent magnet synchronous motor of the motor generates torque with current of the motor in order to generate an appropriate braking pressure, and heat is generated in a motor coil by the current applied thereto.

Specifically, when a high current is continuously applied to the motor coil, the motor coil is burnt out due to accumulated heat, which shortens the lifespan of the motor and brake system.

SUMMARY

Example embodiments of the present disclosure provide a motor control apparatus of a brake system and a control method thereof capable of preventing burnout of a motor and a motor coil due to thermal load.

According to an example embodiment of the present disclosure, a motor control apparatus of a brake system for controlling a motor providing a braking force, includes a motor coil unit disposed in the motor, an inverter configured to supply current to the motor coil unit, a current detector configured to detect motor current supplied to the motor coil unit, and a controller configured to adjust current supplied to the motor by estimating a temperature of the motor coil unit by receiving information detected by the current detector.

In addition, the controller may include a first controller configured to control motor current transferred to a part of the motor coil unit, and a second controller configured to control motor current transferred to the rest of the motor coil unit.

In addition, the motor coil unit may include a first motor coil controlled by the first controller, and a second motor coil controlled by the second controller.

In addition, the inverter may include a first inverter controlled by the first controller and configured to supply current to the first motor coil, and a second inverter controlled by the second controller and configured to supply current to the second motor coil.

In addition, the controller may be configured to, by comparing a temperature of the first motor coil estimated by the first controller and a temperature of the second motor coil estimated by the second controller, adjust the current supplied to the motor based on the relatively high temperature.

In addition, the controller may be configured to, estimate temperatures of the first motor coil and the second motor coil by calculating line-to-line current of the first motor coil and the second motor coil from the motor current detected by the current detector.

In addition, the first motor coil and the second motor coil may be in delta connection.

In addition, the first controller and the second controller may exchange information through communication with each other.

In addition, any one of the first controller and the second controller may be operated as a main controller to calculate a current command value of the motor according to a required pressure.

In addition, the first controller and the second controller may be configured to control the first inverter and the second inverter so that the current is provided to the first motor coil and the second motor coil by distributing the calculated current command values of the motor, respectively.

In addition, when an abnormality occurs in any one of the first controller and the second controller, the controller in which no abnormality occurs is operated as a main controller to calculate a current command value of the motor and control the first inverter or the second inverter so that the current is supplied to the motor coil controlled by the main controller with the calculated current command value of the motor.

Alternatively, the first motor coil and the second motor coil may be in Y connection.

In addition, according to an example embodiment of the present disclosure, a control method of a motor control apparatus of a brake system includes determining a main controller such that any one of a first controller configured to control a first motor coil of a motor and a second controller configured to control a second motor coil of the motor becomes the main controller, estimating a temperature of the first motor coil or the second motor coil by calculating line-to-line current of the first motor coil or the second motor coil, and adjusting current provided to the motor based on the temperature of the first motor coil or the second motor coil.

In addition, the estimating of the temperature of the first motor coil or the second motor coil may include calculating, by the main controller, a motor torque value according to a required pressure, calculating, by the main controller, a current command value provided to the motor so that the calculated motor torque is output, and sharing, by the main controller, the calculated current command value with a sub-controller.

In addition, the estimating of the temperature of the first motor coil or the second motor coil may include controlling, by the main controller, half of the calculated current command value to be supplied to the first motor coil, controlling, by the sub-controller of the first controller and the second controller, half of the calculated current command value to be supplied to the second motor coil, estimating, by the main controller, the temperature of the first motor coil, estimating the temperature of the second motor coil and sharing the estimated temperature with the main controller, by the sub-controller, comparing, by the main controller, the temperature of the first motor coil and the temperature of the second motor coil, and determining, by the main controller, a relatively high temperature of the temperature of the first motor coil and the temperature of the second motor coil as a final temperature.

In addition, the adjusting of the current provided to the motor may include adjusting the current provided to the motor based on the relatively high temperature of the temperature of the first motor coil and the temperature of the second motor coil determined in the determining of the final temperature.

In addition, the adjusting of the current provided to the motor may include determining whether a difference between the temperature of the first motor coil and the temperature of the second motor coil is within a preset temperature range, and when the difference between the temperature of the first motor coil and the temperature of the second motor coil exceeds the preset temperature range, adjusting current so that current for minimum braking is provided to the motor.

In addition, the determining of the main controller may include determining whether an abnormality occurs in any one of the first controller and the second controller, and when an abnormality occurs in any one of the first controller and the second controller, determining a controller in which no abnormality occurs as the main controller.

In addition, the estimating of the temperature of the first motor coil or the second motor coil may include calculating, by the main controller, the motor torque value according to the required pressure, calculating, by the main controller, the current command value provided to the motor so that the calculated motor torque is output, controlling, by the main controller, the calculated current command value to be supplied to a motor coil controlled by the main controller, and estimating, by the main controller, the temperature of the motor coil.

In addition, the estimating of the temperature of the first motor coil or the second motor coil may include calculating line-to-line current of the first motor coil and the second motor coil based on a three-phase motor current transferred to the motor.

According to example embodiments of the present disclosure, a motor control apparatus of a brake system and a control method thereof may prevent the temperature of the motor from overheating by estimating the temperature of the motor coil where the thermal load inside the motor is generated, effectively preventing burnout due to the thermal load of the motor and motor coil.

In addition, the motor control apparatus of the brake system and control method thereof of the present disclosure may reduce the thermal load applied to the motor coil compared to the prior art by distributing and supplying current to each motor coil.

In addition, the motor control apparatus of the brake system and control method thereof according to the present disclosure may estimate the temperature of the motor coil by calculating the line-to-line current, thereby effectively reducing the error in estimating the temperature of the motor coil.

BRIEF DESCRIPTION OF THE DRAWINGS

FIG. 1 illustrates a motor driving apparatus of a brake system according to an example embodiment of the present disclosure.

FIG. 2 illustrates a part of a control process of a first controller and a second controller.

FIG. 3 illustrates a three-phase current application waveform provided to a motor.

FIG. 4 illustrates line-to-line current at a minimum value of a maximum current (Max value) when a motor coil is in delta connection according to an example embodiment of the present disclosure.

FIG. 5 illustrates line-to-line current at a maximum value of a maximum current (Max value) when a motor coil is in delta connection according to an example embodiment of the present disclosure.

FIG. 6 illustrates a case where a motor coil is in Y connection according to another example embodiment of the present disclosure.

FIGS. 7 to 11 illustrate a control method of a motor driving apparatus of a brake system according to an example embodiment of the present disclosure.

DETAILED DESCRIPTION

Hereinafter, example embodiments of the present disclosure will be described in detail with reference to the accompanying drawings so that those skilled in the art can easily carry out the present disclosure. The present disclosure may be implemented in various different forms and is not limited to the example embodiments described herein.

It is noted that the drawings are schematic and not drawn to scale. The relative dimensions and proportions of parts in the drawings are shown exaggerated or reduced in size for clarity and convenience in the drawings, and any dimensions are illustrative only and not limiting. In addition, the same reference numerals are used to indicate similar features in the same structural elements or parts appearing in two or more drawings.

The example embodiments of the present disclosure specifically represent ideal example embodiments of the present disclosure. As a result, various variations of the illustration are expected. Therefore, the example embodiment is not limited to the specific shape of the illustrated area, and includes, for example, modification of the shape by manufacturing.

Hereinafter, referring to FIGS. 1 to 11, a motor control apparatus 101 of a brake system according to an example embodiment of the present disclosure will be described.

A motor 100 is installed in the brake system and generates braking force according to pedal depression provided by a driver. Specifically, the brake system is an electric brake system that senses the driver's will to brake and generates required braking pressure through motor driving.

The motor control apparatus 101 of the brake system according to an example embodiment of the present disclosure includes a motor coil unit 110, an inverter 300, a current detector 200, and a controller 400 as shown in FIG. 1.

The motor coil unit 110 is disposed in the motor 100. Specifically, the motor coil unit 110 is wound inside the motor 100 and current is applied to rotate a rotor (not shown) inside the motor 100.

The inverter 300 supplies current to the motor coil unit 110. Specifically, the inverter 300 is operated to respond to load of the motor 100 and may output AC power of various frequencies.

The current detector 200 may detect motor current supplied to the motor 100 from the motor coil unit 110. Specifically, the current detector 200 may detect motor current information output from the motor coil unit 110 and provided to the motor coil unit 110.

The controller 400 receives information on the motor current detected by the current detector 200. In addition, the controller 400 estimates the temperature of the motor coil unit 110 based on the information detected by the current detector 200. In addition, the controller 400 may adjust current or power output from the inverter 300 to prevent overheating of the motor 100 according to the estimated temperature of the motor coil unit 110.

With such a configuration, the motor control apparatus 101 of the brake system according to an example embodiment of the present disclosure may adjust the current supplied to the motor 100 by estimating the temperature of the motor coil unit 110, thereby effectively preventing overheating of the motor 100 due to a thermal load caused by the amount of current applied to the motor coil unit 110.

In addition, the motor control apparatus 101 of the brake system according to an example embodiment of the present disclosure may estimate the temperature of the motor coil unit 110, thereby effectively estimating overheating of the motor 100 without a separate sensor for detecting internal and external temperatures of the motor 100.

In addition, the controller 400 according to an example embodiment of the present disclosure may include a first controller 410 and a second controller 420 as shown in FIGS. 1 and 2.

The first controller 410 may control current transferred to a part of the motor coil unit 110. Specifically, the first controller 410 may control the inverter 300 to control the current transferred to the part of the motor coil unit 110.

The second controller 420 may control the current transferred to the rest of the motor coil unit 110. Specifically, the second controller 420 may control the current transferred to the rest of the motor coil unit 110 by controlling the inverter 300.

Accordingly, the motor coil unit 110 according to an example embodiment of the present disclosure may include a first motor coil 111 and a second motor coil 112.

The first motor coil 111 may be controlled by the first controller 410.

The second motor coil 112 may be controlled by the second controller 420.

Specifically, the motor coil unit 110 may include a plurality of motor coils each controlled by a controller.

Therefore, the motor control apparatus 101 of the brake system according to an example embodiment of the present disclosure may divide and supply the amount of current applied to each coil, thereby reducing the total thermal load by ¼. Specifically, the temperature of the motor coil is proportional to the square of the current applied to the resistance component of the coil, and the controller 400 according to an example embodiment of the present disclosure may divide the amount of current applied to each motor coil, thereby reducing thermal load generated from the resistance.

In addition, the inverter 300 according to an example embodiment of the present disclosure may include a first inverter 310 and a second inverter 320.

The first inverter 310 is controlled by the first controller 410 and may supply current to the first motor coil 111.

The second inverter 320 is controlled by the second controller 420 and may supply current to the second motor coil 112.

Accordingly, each controller may perform current distribution to each motor coil by controlling the first inverter 310 and the second inverter 320.

In addition, the controller 400 according to an example embodiment of the present disclosure may, by comparing the temperature of the first motor coil 111 estimated by the first controller 410 with the temperature of the second motor coil 112 estimated by the second controller 420, adjust the current supplied to the motor 100 based on the relatively high temperature.

The first controller 410 estimates the temperature of the first motor coil 111 from the current applied to the first motor coil 111.

The second controller 420 estimates the temperature of the second motor coil 112 from the current applied to the second motor coil 112.

In addition, the temperature of the first motor coil 111 estimated by the first controller 410 and the temperature of the second motor coil 112 estimated by the second controller 420 are compared. Specifically, the controller 400 may base the temperature standard for adjusting the current supplied to the motor 100 on a relatively high temperature value of the above-described compared motor coil temperatures.

In other words, the controller 400 may select the relatively high motor coil temperature of the temperature of the first motor coil 111 and the temperature of the second motor coil 112, so as to control the current to the motor 100 to lower the estimated temperature of the motor coil so that the motor 100 is prevented from rising in temperature due to the applied current.

In other words, the controller 400 may assume the relatively high temperature of the motor coil as the temperature of the motor 100 and lower the current applied thereto, thereby effectively preventing damage due to thermal load of the motor 100 and the brake system including the same due to the application of high current for a long time.

In addition, the controller 400 according to an example embodiment of the present disclosure may calculate the line-to-line current of the first motor coil 111 and the second motor coil 112 from the motor current detected by the current detector 200 to estimate the temperatures of the first motor coil 111 and the second motor coil 112.

The current detector 200 may detect motor current information supplied from the inverter 300 to the first motor coil 111 and the second motor coil 112, respectively, and transfer to the first controller 410 and the second controller 420.

The first controller 410 may receive motor current information supplied from the inverter 300 to the first motor coil 111 by the current detector 200. In addition, the first controller 410 may estimate the temperature of the first motor coil 111 by calculating the line-to-line current of the first motor coil 111 based on the information detected by the current detector 200.

The second controller 420 may receive motor current information supplied from the inverter 300 to the second motor coil 112 by the current detector 200. In addition, the second controller 420 may estimate the temperature of the second motor coil 112 by calculating the line-to-line current of the second motor coil 112 based on the information detected by the current detector 200.

Specifically, the first controller 410 and the second controller 420 may estimate the temperature of the motor coil by calculating the line-to-line current of the motor coil.

At this time, the first motor coil 111 and the second motor coil 112 may be in delta connection as shown in FIGS. 4 and 5.

In other words, when the first motor coil 111 and the second motor coil 112 are in delta connection, the controller 400 may calculate the line-to-line current of the first motor coil 111 and the second motor coil 112 from the motor current detected by the current detector 200 and use it for temperature estimation.

Alternatively, as shown in FIG. 6, the first motor coil 111 and the second motor coil 112 according to another example embodiment of the present disclosure may have Y connection.

When the first motor coil 111 and the second motor coil 112 are in Y connection, the controller 400 may estimate the temperatures of the first motor coil 111 and the second motor coil 112 with the motor current detected by the current detector 200. Specifically, when the first motor coil 111 and the second motor coil 112 are in Y connection, the motor current detected by the current detector 200 is a phase current, and the temperature of the motor coil may be estimated based thereon.

Alternatively, the controller 400 according to an example embodiment of the present disclosure may receive the three-phase motor current provided to the motor coil unit 110 by the respective inverters 310 and 320 from the current detector 200, and estimate the temperatures of the first motor coil 111 and the second motor coil 112 thereon. In other words, the current detector 200 detect such three-phase motor current and transfer to each controller.

For example, the motor 100 according to an example embodiment of the present disclosure is a three-phase permanent magnet synchronous motor and may generate torque with current of the motor.

The current detector 200 may detect three-phase motor currents of U-phase, V-phase, and W-phase. The current detector 200 may transfer the detected three-phase motor current to the controller 400.

At this time, as shown in FIG. 3, the controller 400 may calculate a maximum current (Max value) having a maximum absolute value among U-phase, V-phase, and W-phase motor currents according to rotation of the rotor of the motor 100.

Alternatively, as shown in FIG. 6, when the motor coil includes Y connection, the controller 400 may estimate the temperatures of the first motor coil 111 and the second motor coil 112 based on the motor current detected by the current detector 200.

When the first motor coil 111 or the second motor coil 112 is in Y connection, since the motor current detected by the current detector 200 is the phase current of the first motor coil 111 and the second motor coil 112, the controller 440 may estimate the temperature of the first motor coil 111 or the second motor coil 112 based thereon.

Alternatively, the controller 400 according to an example embodiment of the present disclosure may calculate line-to-line current of the first motor coil 111 and the second motor coil 112 based on the three-phase motor current detected by the current detector 200.

For example, as shown in FIGS. 3 to 5, when the motor coil of the motor coil unit 110 of the present disclosure includes delta connection, the current detector 200 may detect three-phase motor currents of U-phase, V-phase, and W-phase.

At this time, the first controller 410 may calculate a maximum current (Max value) having a maximum absolute value among U-phase, V-phase, and W-phase motor currents according to the rotation of the rotor of the motor 100. Specifically, as shown in FIG. 3, the maximum current may be the magnitude of the maximum current having the maximum absolute value among motor currents of U-phase, V-phase, and W-phase.

In addition, the first controller 410 may calculate the line-to-line current of the first motor coil 111 when the maximum value A of the maximum current, which is the largest value among the maximum currents (Max values). The first controller 410 may allow the temperature of the first motor coil 111 at the maximum value A of the maximum current, which is the largest value among the maximum currents (Max values) of current values according to the electrical angle to be estimated.

For example, as shown in FIG. 3, in the case of the temperature of the first motor coil 111 at the lowest value B of the maximum current (Max value), when estimating the temperature of the first motor coil 111 with the motor current, it may be predicted to be lower than the actual temperature of the first motor coil 111.

In other words, at the lowest value B of the maximum current (Max value), as shown in FIGS. 3 and 4, the amount of three-phase current applied to the motor coil detected by the current detector 200 is shown. When the current of U-phase is 51 A, the current of V-phase is −51 A, and the current of W-phase is 0 A, the line-to-line current of UV may be calculated as 102 A, the line-to-line current of WU may be calculated as −51 A, and the line-to-line current of VW may be calculated as −51 A by the first controller 410.

Alternatively, at the maximum value A which is the largest value of the maximum current (Max value), the amount of three-phase current applied to the coil is shown as shown in FIGS. 3 and 5.

In other words, at the maximum value A of the maximum current which is the largest value of the maximum current (Max value), as shown in FIG. 5, the amount of three-phase current applied to the motor coil detected by the current detector 200 is shown. When the current of U-phase is 60 A, the current of V-phase is −30 A, and the current of W-phase is −30 A, the line-to-line current of UV may be calculated as 90 A, the line-to-line current of WU may be calculated as 90 A, and the line-to-line current of VW may be calculated as 0 A by the first controller 410.

As shown in FIGS. 3 to 5, even if the maximum current (Max value) of the three-phase currents detected by the current detector 200 is low, the line-to-line current may be calculated high, and even if the maximum current (Max value) of the three-phase motor currents detected by the current detector 200 is high, the line-to-line current may be calculated low.

Specifically, as shown in FIG. 4, the maximum current (Max value) may be minimum but a large current may flow for the line-to-line current of UV and it may be determined as a severe condition. In addition, as shown in FIG. 5, the maximum current (Max value) may be maximum, but the UV line-to-line current may be a relatively lower value than the line-to-line current of UV at the maximum current (Max value).

In other words, the temperature of the motor 100 may be estimated more accurately by estimating the temperature thereof based on line-to-line current information of the motor coil where heat is actually generated than the maximum current value among the three-phase motor currents detected by the current detector 200.

In other words, the first controller 410 may more accurately estimate the temperature of the motor 100 and the first motor coil 111 by calculating the line-to-line current, which is the applied current of the motor 100 of delta connection.

In the above case, it has been described that the first controller 410 calculates the line-to-line current for estimating the temperature of the first motor coil 111, and the second controller 420 may also estimate the temperature of the second motor coil 112 by calculating the line-to-line current as described above.

Alternatively, as shown in FIG. 6, when the motor coil includes Y connection, since the motor current detected by the current detector 200 is the phase current value of the three-phase current of each motor coil, the controller 400 may estimate the temperatures of the first motor coil 111 and the first motor coil 112 based on the three-phase current of each motor coil detected by the current detector 200.

In other words, the amount of three-phase motor current applied to the motor coil, as shown in FIG. 6, when the motor current of U-phase is 60 A, the motor current of V-phase is −30 A, and the motor current of W-phase is −30 A, the phase current of U is 60 A, the phase current of V is −30 A, and the phase current of W is −30 A.

In other words, when the motor coil is in Y connection, the motor current detected by the current detector 200 is the phase current of the three-phase current, and the controller 400 may estimate the temperature of the motor coil based thereon.

In addition, the motor control apparatus 101 of the brake system according to an example embodiment of the present disclosure may further include a communication unit 500.

The first controller 410 and the second controller 420 may share information estimated or calculated by each other through the communication unit 500.

The first controller 410 and the second controller 420 may exchange and share information with each other through the communication unit 500.

In addition, as shown in FIGS. 1 and 2, any one of the first controller 410 and the second controller 420 according to an example embodiment of the present disclosure may be operated as the main controller.

One of the first controller 410 and the second controller 420 may operate as a main controller and the other may operate as a sub-controller.

In addition, the main controller of any one of the first controller 410 and the second controller 420 according to an example embodiment of the present disclosure may calculate a current command value of the motor 100 according to the required pressure.

One of the first controller 410 and the second controller 420 becomes the main controller and may calculate the current command value of the motor 100 corresponding to torque to be output by the motor 100 according to the required pressure required according to the operation of the brake pedal.

As shown in FIG. 2, the main controller may calculate the current command value at which the motor 100 should be operated to provide braking force to correspond to a currently operated brake pedal.

Specifically, the main controller may share the calculated current command value with the sub-controller.

In addition, the first controller 410 and the second controller 420 according to an example embodiment of the present disclosure may distribute the calculated current command value of the motor 100 to provide current to the first motor coil 111 and the second motor coil 112.

The main controller, which is any one of the first controller 410 and the second controller 420, may calculate the current command value of the motor 100 corresponding to the torque to be output by the motor 100 according to the required pressure required according to the operation of the brake pedal, and share the calculated current command value of the motor 100 with the sub-controller.

The main controller and the sub-controller may control the inverter 300 so that current is supplied to the first motor coil 111 and the second motor coil 112 by distributing the calculated current command value of the motor 100.

Specifically, the main controller may allow half of the calculated current command value of the motor 100 to be applied to the motor coil controlled by it. In addition, the sub-controller may allow half of the calculated current command value of the motor 100 to be applied to the motor coil controlled by it.

In other words, the main controller may allow the main controller and the sub-controller to allow first inverter 310 and the second inverter 320 to apply half of the current command values calculated to the first motor coil 111 and the second motor coil 112, respectively.

In addition, the motor control apparatus 101 according to an example embodiment of the present disclosure may, when an abnormality occurs in any one of the first controller 410 and the second controller 420, allow the controller in which no abnormality occurs to be operated as the main controller.

When an abnormality occurs in any one of the first controller 410 and the second controller 420, the controller in which no abnormality occurs may be operated as the main controller. Specifically, when information is not exchanged and shared from any one of the first controller 410 and the second controller 420 that exchange and share information with each other through the communication unit 500, it may be determined as abnormal.

The main controller may allow all of the calculated current command values of the motor 100 to be applied to the motor coil controlled by it.

In other words, when an abnormality occurs in any one of the plurality of controllers, the inverter 300 may be controlled so that 100% of the current command value of the motor 100 calculated from the motor coil controlled by the main controller in which no abnormality occurs is provided.

In addition, the motor control apparatus 101 of the brake system according to an example embodiment of the present disclosure may further include a battery 600.

The battery 600 may provide power for the operation of the inverter 300.

Specifically, the first inverter 310 may receive power from the first battery 610, and the second inverter 320 may receive power from the second battery 620.

In addition, the motor control apparatus 101 of the brake system according to an example embodiment of the present disclosure may further include an angle detector 700.

The angle detector 700 may detect the electrical angle of the motor 100. Specifically, the angle detector 700 may detect the current phase of the motor 100. In addition, the angle detector 700 may transfer current phase information of the detected motor 100 to the controller 400.

Hereinafter, referring to FIGS. 1 to 11, the control process of the motor control apparatus 101 of the brake system according to an example embodiment of the present disclosure will be described.

As shown in FIG. 7, the control process of the motor control apparatus of the brake system includes an operation of determining the main controller (S100), an operation of estimating the motor coil temperature (S200), and an operation of adjusting the current (S300).

It is determined that any one of the first controller 410 and the second controller 420 to be the main controller (S100).

The first controller 410 and the second controller 420 exchange and share information with each other through the communication unit 500, and any one of the first controller 410 or the second controller 420 may be preset to be the main controller in priority.

Specifically, as shown in FIG. 8, an abnormality is determined in any one of the first controller 410 or the second controller 420 (S110). In other words, the first controller 410 and the second controller 420 may determine whether there is a failure based on signal state information received through information exchange with each other.

When neither the first controller 410 nor the second controller 420 has an abnormality, it is determined that the first controller 410 operates as a main controller (S120). The priority of which of the plurality of controllers is to be the main controller may be set in advance.

Alternatively, when an abnormality occurs in any one of the first controller 410 or the second controller 420, it is determined that the controller in which no abnormality occurs is operated as the main controller (S130).

The temperature of the first motor coil 111 or the second motor coil 112 is estimated (S200).

An example embodiment in which the first controller 410 operates as a main controller will be described.

Specifically, as shown in FIG. 9, when neither the first controller 410 nor the second controller 420 has an abnormality, the main controller 410 calculates a motor torque value according to the required pressure (S210). The main controller 410 calculates a torque value that the motor 100 should output according to the required pressure required according to the current brake pedal operation.

The main controller 410 calculates a current command value that should be applied to the motor 100 so that the calculated motor torque is output from the motor 100 (S211).

The main controller 410 shares the calculated current command value with the sub-controller 420 (S212). In other words, the main controller 410 transfers and shares the calculated current command value information to the sub-controller 420 through the communication unit.

The main controller 410 allows half of the calculated current command value to be supplied to the first motor coil 111 (S213). The main controller 410 controls the inverter 300 so that a current of 50% of the calculated current command value is applied to the first motor coil 111.

The sub-controller 420 allows half of the calculated current command value to be supplied to the second motor coil 112 (S214). The sub-controller 420 controls the inverter 300 so that a current of 50% of the calculated current command value is applied to the second motor coil 112.

The main controller 410 estimates the temperature of the first motor coil 111 (S216). Specifically, the main controller 410 calculates the line-to-line current of the first motor coil 111 based on the three-phase motor current supplied to the motor 100 detected by the current detector 200. The main controller 410 may calculate line-to-line current of the first motor coil 111 based on the three-phase motor current provided to the first motor coil 111 detected by the current detector 200.

In other words, the main controller 410 may calculate the line-to-line current of the first motor coil 111 based on the three-phase motor current supplied to the first motor coil 111 having delta connection. Therefore, the main controller 410 may effectively estimate the temperature of the heating unit by calculating the line-to-line current of the first motor coil 111 in the motor coil 111 in which the actual motor 100 generates heat.

The sub-controller 420 estimates the temperature of the second motor coil 112 and transfers it to the main controller 410 (S217). Specifically, the sub-controller 420 calculates the line-to-line current of the second motor coil 112 based on the three-phase motor current supplied to the motor 100 detected by the current detector 200. The sub-controller 420 may calculate line-to-line current of the second motor coil 112 based on the three-phase motor current provided to the second motor coil 112 detected by the current detector 200.

In addition, the sub-controller 420 transfers the estimated temperature of the second motor coil 112 to the main controller 410.

The main controller 410 compares the estimated temperature of the first motor coil 111 and the estimated temperature of the second motor coil 112. The main controller 410 compares the temperature of the first motor coil 111 estimated by the main controller 410 with the temperature of the second motor coil 112 estimated by the sub-controller 420.

The main controller 410 determines a relatively high temperature of the temperature of the first motor coil 111 and the temperature of the second motor coil 112 as the final temperature for temperature control of the motor 100 (S218). Specifically, when controlling the current to prevent overheating of the motor 100, the main controller 410 may assume that the current temperature of the motor 100 is a relatively higher temperature of the temperature of the first motor coil 111 and the temperature of the second motor coil 112 to perform the control. In other words, the main controller 410 may control the current to prevent thermal load on the motor 100 based on the temperature of the motor coil, which is estimated to be relatively higher than the actual internal heating temperature.

In the operation of adjusting current (S300), the main controller 410 adjusts the current provided to the motor 100 to prevent the motor 100 from overheating based on the relatively high temperature of the temperature of the first motor coil 111 and the temperature of the second motor coil 112.

In addition, in the operation of adjusting current (S300), as shown in FIG. 11, the main controller 410 calculates the temperature difference between the temperature of the first motor coil 111 and the temperature of the second motor coil 112 and determines whether it is within a preset temperature range (S310). For example, when the high value of the estimated motor coil temperatures is estimated to be a temperature range generating a thermal load, current provided to the motor may be adjusted.

In addition, the main controller 410 may determine whether the first motor coil 111 and the second motor coil 112 or the motor 100 have an abnormality by comparing the temperature difference with a preset temperature range.

When the temperature of the first motor coil 111 exceeds a preset temperature range, the main controller 410 determines that there is an abnormality in the motor 100 and controls the inverter 300 so that current for minimum braking of the brake system is applied to the motor 100 (S340). Specifically, the motor 100 should be able to implement the minimum braking force set to provide the braking force of the brake system.

Alternatively, when the temperature of the first motor coil 111 is within a preset temperature range, the main controller 410 may control the inverter 300 so that a current lower than the current command value by a predetermined value is provided to the motor 100 in order to prevent the motor 100 from thermal load by heat generation. In other words, the current applied to the motor 100 at this time may be within a range capable of preventing a thermal load of the current motor 100 without greatly reducing the required braking force.

Alternatively, as shown in FIG. 10, when an abnormality occurs in any one of the first controller 410 or the second controller 420, the main controller calculates a motor torque value according to the required pressure (S220). The main controller calculates the torque value to be output by the motor 100 according to the required pressure required according to the current brake pedal operation.

The main controller calculates the current command value provided to the motor 100 so that the calculated motor torque is output (S221).

The main controller controls the calculated current command value to be supplied to the motor coil controlled by the main controller (S222). Specifically, the main controller controls the inverter 300 so that 100% of the calculated current command value is supplied to the motor coil controlled by the main controller.

The main controller estimates the temperature of the motor coil by calculating line-to-line current of the motor coil based on the three-phase motor current provided to the motor coil detected by the current detector 200 (S223).

In addition, the main controller adjusts the current provided to the motor 100 to prevent thermal load on the motor 100 by assuming the estimated motor coil temperature as the temperature of the motor 100.

With such a configuration, the motor driving apparatus for a brake system and a control method thereof according to an example embodiment of the present disclosure may control the temperature of the motor 100 by effectively estimating the temperature of a motor coil where a thermal load of the motor 100 is generated.

Therefore, the motor driving apparatus of the brake system and the control method thereof according to an example embodiment of the present disclosure may effectively prevent the life span of the motor 100 from deteriorating due to thermal load and effectively provide the braking force necessary for the braking force of the brake.

Further, the motor driving apparatus of the brake system and the control method thereof according to an example embodiment of the present disclosure may effectively reduce the amount of heat generated by the motor by dividing and controlling a current path applied to a separate motor.

Although the example embodiments of the present disclosure have been described with reference to the accompanying drawings, those skilled in the art to which the present disclosure pertains will understand that the present disclosure may be embodied in other specific forms without changing its technical spirit or essential features.

Therefore, the example embodiments described above should be understood as illustrative in all respects and not limiting, the scope of the present disclosure is indicated by the following detailed description of the claims, and all changes or modifications derived from the meaning and scope of the claims and their equivalent concepts should be construed as being included in the scope of the present disclosure.

EXPLANATION OF REFERENCE NUMERALS

| | |
|---|---|
| 100: Motor | 101: Motor control apparatus of brake system |
| 110: Motor coil unit | 111: First motor coil |
| 112: Second motor coil | |
| 200: Current detector | 300: Inverter |
| 310: First inverter | 320: Second inverter |
| 400: Controller | 410: First controller |
| 420: Second controller | |

What is claimed is:

1. A motor control apparatus of a brake system, the motor control apparatus comprising:

a motor coil unit disposed on a motor and including a first motor coil and a second motor coil;

an inverter including a first inverter configured to supply current to the first motor coil and a second inverter configured to supply current to the second motor coil;

a current detector configured to detect motor current supplied to the motor coil unit; and a controller configured to adjust current supplied to the motor by estimating a temperature of the motor coil unit by receiving information detected by the current detector, wherein the controller includes:

a first control unit configured to control the first inverter and to control current supplied to the first motor coil; and a second control unit configured to control the second inverter and to control current supplied to the second motor coil, wherein one of the first control unit and the second control unit is configured to be determined as a main controller, and the other one of the first control unit and the second control unit is configured to be determined as a sub-controller; and wherein the main controller configured to calculate a motor torque value according to a required pressure, to calculate a current command value of the motor according to the required pressure, and to share the calculated current command value with the sub-controller.

2. The motor control apparatus of claim 1, wherein the controller is configured to, by comparing a temperature of the first motor coil estimated by the first controller and a temperature of the second motor coil estimated by the second controller, adjust the current supplied to the motor based on the relatively high temperature.

3. The motor control apparatus of claim 1, wherein the controller is configured to estimate temperatures of the first motor coil and the second motor coil by calculating line-to-line current of the first motor coil and the second motor coil from the motor current detected by the current detector.

4. The motor control apparatus of claim 3, wherein the first motor coil and the second motor coil are in delta connection.

5. The motor control apparatus of claim 1, wherein the first controller and the second controller exchange information through communication with each other.

6. The motor control apparatus of claim 1, wherein the first controller and the second controller are configured to control the first inverter and the second inverter so that the current is provided to the first motor coil and the second motor coil by distributing the calculated current command values of the motor, respectively.

7. The motor control apparatus of claim 1, wherein, when an abnormality occurs in any one of the first controller and the second controller, the controller in which no abnormality occurs is operated as the main controller to calculate a current command value of the motor and control the first inverter or the second inverter so that the current is supplied to the motor coil controlled by the main controller with the calculated current command value of the motor.

8. The motor control apparatus of claim 1, wherein the first motor coil and the second motor coil are in Y connection.

9. A control method of a motor control apparatus of a brake system, the control method comprising:

determining a main controller such that any one of a first controller configured to control a first motor coil of a motor and a second controller configured to control a second motor coil of the motor becomes the main controller;

estimating a temperature of the first motor coil or the second motor coil by calculating line-to-line current of the first motor coil or the second motor coil; and adjusting current provided to the motor based on the temperature of the first motor coil or the second motor coil, wherein the estimating of the temperature of the first motor coil or the second motor coil comprises:

calculating, by the main controller, a motor torque value according to a required pressure;

calculating, by the main controller, a current command value provided to the motor so that the calculated motor torque is output; and sharing, by the main controller, the calculated current command value with a sub-controller.

10. The control method of claim 9, wherein the estimating of the temperature of the first motor coil or the second motor coil comprises:

controlling, by the main controller, half of the calculated current command value to be supplied to the first motor coil;

controlling, by the sub-controller of the first controller and the second controller, half of the calculated current command value to be supplied to the second motor coil;

estimating, by the main controller, the temperature of the first motor coil;

estimating the temperature of the second motor coil and sharing the estimated temperature with the main controller, by the sub-controller;

comparing, by the main controller, the temperature of the first motor coil and the temperature of the second motor coil; and determining, by the main controller, a relatively high temperature of the temperature of the first motor coil and the temperature of the second motor coil as a final temperature.

11. The control method of claim 10, wherein the adjusting of the current provided to the motor comprises adjusting the current provided to the motor based on the relatively high temperature of the temperature of the first motor coil and the temperature of the second motor coil determined in the determining of the final temperature.

12. The control method of claim 10, wherein the adjusting of the current provided to the motor comprises:

determining whether a difference between the temperature of the first motor coil and the temperature of the second motor coil is within a preset temperature range; and when the difference between the temperature of the first motor coil and the temperature of the second motor coil exceeds the preset temperature range, adjusting current so that current for minimum braking is provided to the motor.

13. The control method of claim 12, wherein the estimating of the temperature of the first motor coil or the second motor coil comprises:

calculating, by the main controller, the motor torque value according to the required pressure;

calculating, by the main controller, the current command value provided to the motor so that the calculated motor torque is output;

controlling, by the main controller, the calculated current command value to be supplied to a motor coil controlled by the main controller; and estimating, by the main controller, the temperature of the motor coil.

14. The control method of claim 9, wherein the determining of the main controller comprises:

determining whether an abnormality occurs in any one of the first controller and the second controller; and when an abnormality occurs in any one of the first controller and the second controller, determining a controller in which no abnormality occurs as the main controller.

15. The control method of claim 9, wherein the estimating of the temperature of the first motor coil or the second motor coil comprises calculating line-to-line current of the first motor coil and the second motor coil based on a three-phase motor current transferred to the motor.

* * * * *